United States Patent
Ur et al.

(10) Patent No.: US 11,882,456 B2
(45) Date of Patent: Jan. 23, 2024

(54) WIRELESS LAN ROUTER, DETECTION METHOD, AND DETECTION PROGRAM

(71) Applicant: NIPPON TELEGRAPH AND TELEPHONE CORPORATION, Tokyo (JP)

(72) Inventors: Shmuel Ur, Shorashim (IL); David Ash, Kirkland, WA (US); Vlad Dabija, Mountain View, CA (US)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 269 days.

(21) Appl. No.: 17/372,071

(22) Filed: Jul. 9, 2021

(65) Prior Publication Data

US 2023/0011173 A1 Jan. 12, 2023

(51) Int. Cl.
*H04W 12/63* (2021.01)
*H04W 64/00* (2009.01)
*G06N 20/00* (2019.01)
*H04W 88/08* (2009.01)
*H04W 12/08* (2021.01)

(52) U.S. Cl.
CPC .......... *H04W 12/63* (2021.01); *G06N 20/00* (2019.01); *H04W 12/08* (2013.01); *H04W 64/006* (2013.01); *H04W 88/08* (2013.01)

(58) Field of Classification Search
CPC ... H04W 12/63; H04W 12/08; H04W 64/006; H04W 88/08; G06N 20/00
See application file for complete search history.

(56) References Cited

U.S. PATENT DOCUMENTS

| | | | |
|---|---|---|---|
| 10,104,098 B2 | 10/2018 | Baxley et al. | |
| 2015/0155625 A1* | 6/2015 | Park | H01Q 9/0407 342/368 |
| 2017/0285171 A1* | 10/2017 | Ries | H04K 1/00 |
| 2019/0207965 A1 | 7/2019 | Espinosa et al. | |

* cited by examiner

Primary Examiner — Curtis B Odom

(57) ABSTRACT

A wireless LAN router includes a directional antenna configured to transmit and receive wireless signals to and from each device, and a processing circuit. The processing circuit learns training data indicating an incoming direction of a wireless signal from an authorized device. The processing circuit then determines whether a wireless signal of a detection target device is a wireless signal from an authorized direction, using an incoming direction of the wireless signal from the detection target device received by the directional antenna and the training data obtained by the machine learning, and outputs a result of determination.

9 Claims, 3 Drawing Sheets

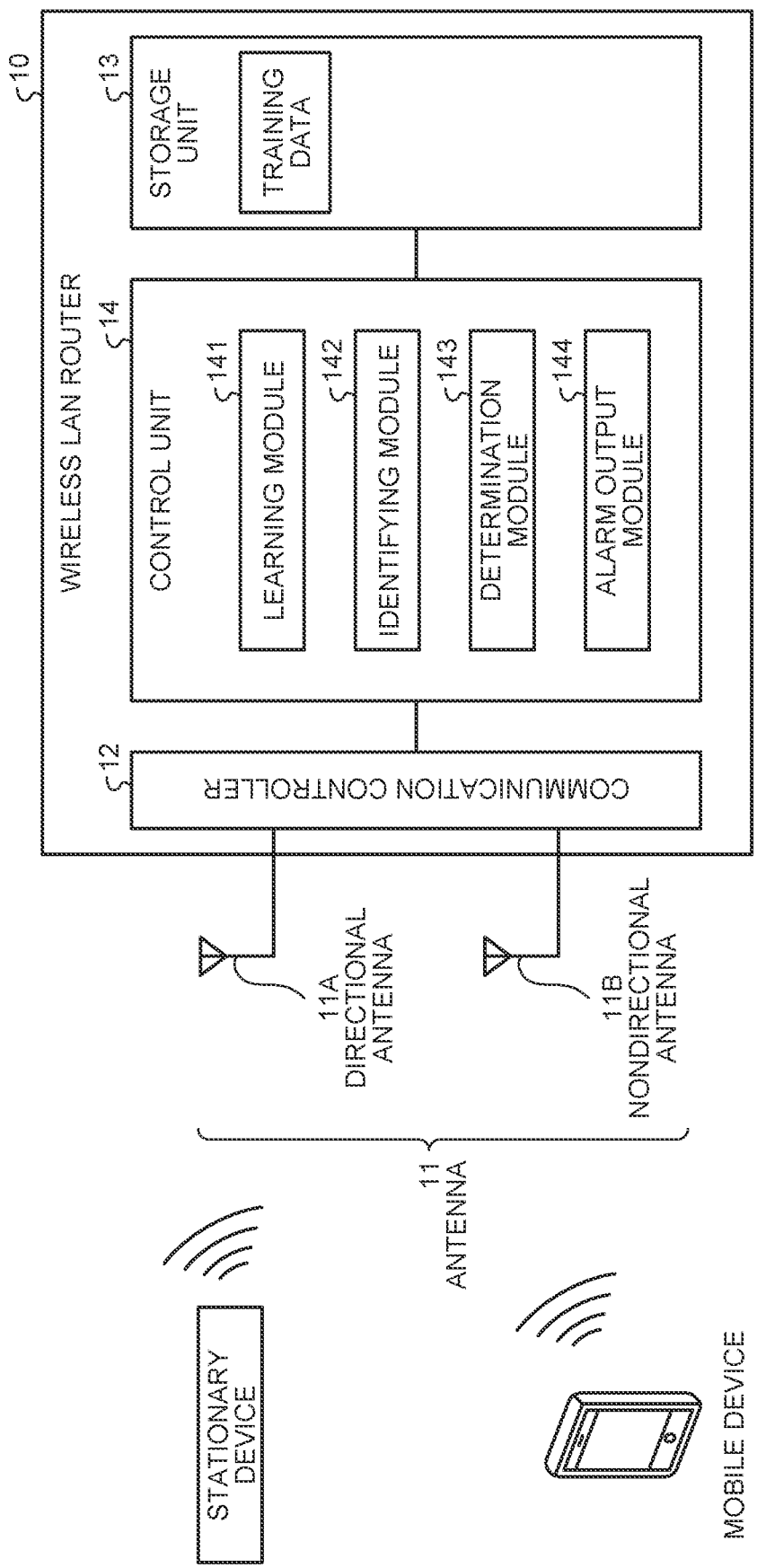

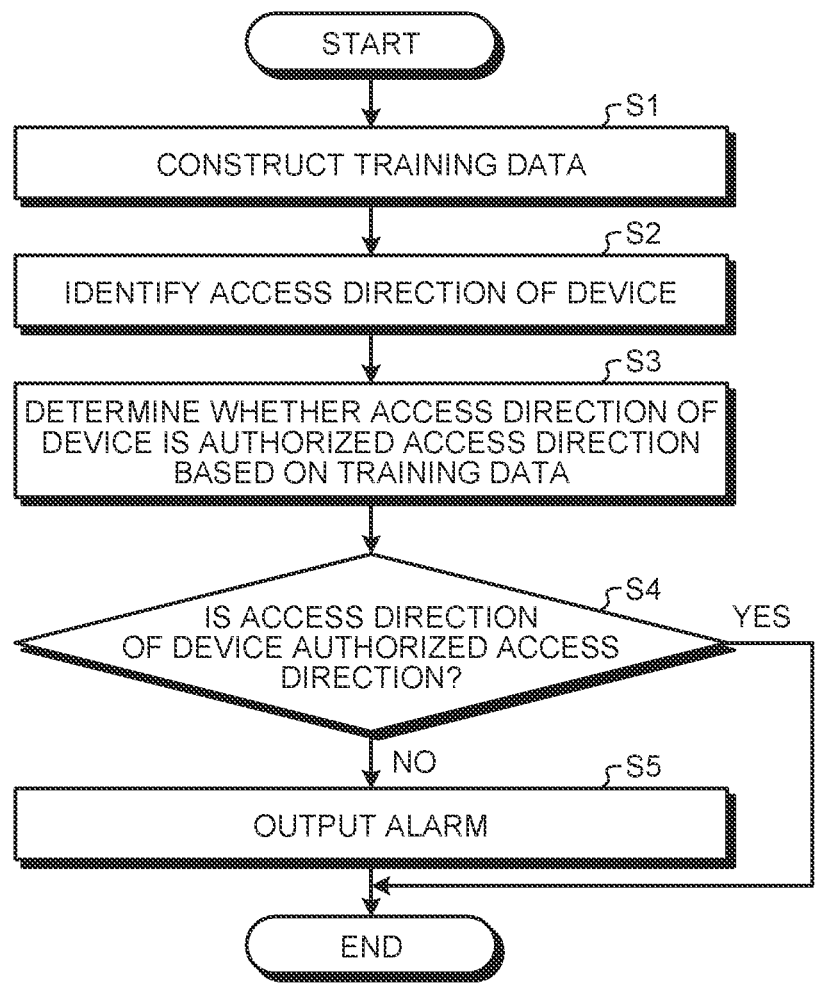

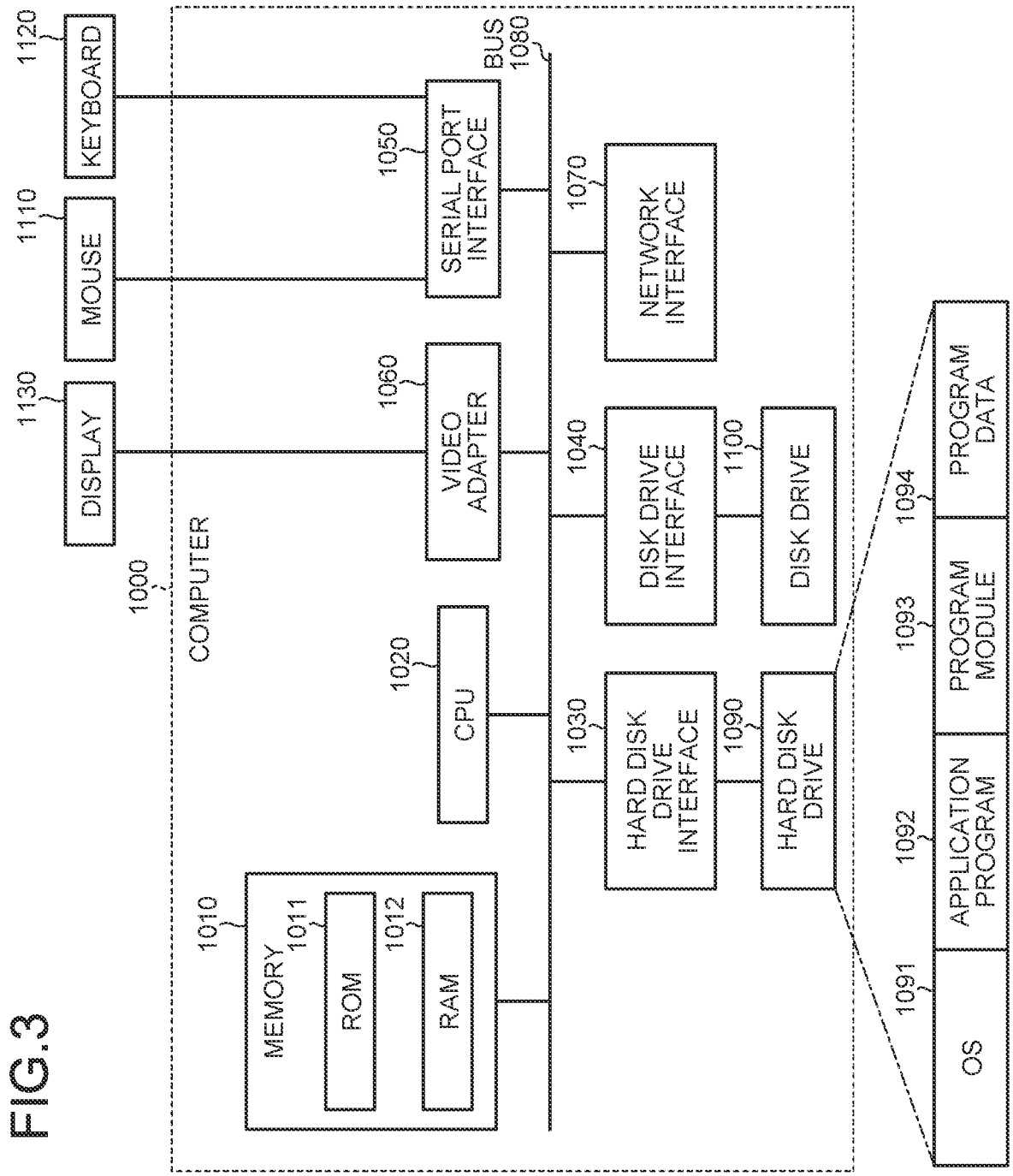

WIRELESS LAN ROUTER, DETECTION METHOD, AND DETECTION PROGRAM

BACKGROUND OF THE INVENTION

1. Field of the Invention

The present invention relates to a wireless LAN router, a detection method, and a detection program.

2. Description of the Related Art

With the spread of Internet of Things (IoT), devices connected to computer networks have been increasing and those networks have more often been targeted for attack. One of attack types that is more frequently used and difficult to defend is man-in-the-middle attacks.

In a main-in-the middle attack against wireless communication, an attacker impersonating a wireless LAN router attacks a device connected to a network or an attacker impersonating a device connected to a network attacks a wireless LAN router. For example, the attacker pretends to be a thermometer and causes a malfunction in a system for "high temperature".

Such attacks are frequent and highly complicated, and many methods for defending against these attacks have been invented so far. Many of defense methods use cryptography to allow devices to identify and securely communicate with each other.

However, it is not uncommon for hackers to connect to a wireless LAN router physically residing in the office and access a corporate network.

For example, a hacker connects to a network from a car parked outside a company building or from the neighborhood of a company outside the premises of the company (likely to connect using a direct or man-in-the middle attack). There are more problems in particular when a building has multiple tenants and access control to the building is not sufficient.

SUMMARY OF THE INVENTION

It is an object of the present invention to at least partially solve the problems in the conventional technology. The present invention is a wireless LAN router comprising: a directional antenna configured to transmit and receive wireless signals to and from each device; and a processing circuit, wherein the processing circuit is configured to learn training data indicating an incoming direction of a wireless signal from an authorized device, determine whether a wireless signal of a detection target device is a wireless signal from an authorized direction, using an incoming direction of the wireless signal from the detection target device received by the directional antenna and the training data obtained by the machine learning, and output a result of the determination.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating an overall configuration of a wireless LAN router in the present embodiment;

FIG. 2 is a flowchart illustrating an exemplary detection process procedure; and FIG. 3 is a diagram illustrating an exemplary computer that executes a detection program.

DETAILED DESCRIPTION OF THE PREFERRED EMBODIMENTS

A preferred embodiment of a wireless local area network (LAN) router according to the present invention will be described in detail below with reference to the drawings. It should be noted that the present invention is not limited by this embodiment. In a description of the drawings, the same parts are denoted by the same reference signs.

Embodiment

Configuration of Wireless LAN Router

The diagram illustrates an overall configuration of a wireless LAN router in the present embodiment. As illustrated in FIG. 1, a wireless LAN router 10 in the present embodiment includes antennas 11, a communication controller 12, a storage unit 13, and a control unit 14. The wireless LAN router 10 connects a device (for example, a stationary device or a mobile device illustrated in FIG. 1) to a network such as a LAN and the Internet via wireless communication.

The antennas 11 are antennas for transmitting and receiving wireless signals to and from devices. At least one antenna 11 of the antennas 11 mounted on the wireless LAN router 10 is a directional antenna 11A. Here, the wireless LAN router 10 includes a directional antenna 11A and a nondirectional antenna 11B, by way of example.

The communication controller 12 is implemented, for example, by a network interface card (NIC) and controls communication between an external device and the control unit 14 via a telecommunication line such as a LAN and the Internet. For example, the communication controller 12 controls communication between a device (stationary device, mobile device) that performs wireless communication and the control unit 14 via the antenna 11.

The storage unit 13 is implemented by a semiconductor memory device such as a random access memory (RAM) and a flash memory or a storage device such as a hard disk or an optical disk. A process program to operate the wireless LAN router 10 and data used during execution of the process program are stored in advance or temporarily stored for every process in the storage unit 13.

For example, training data learned by the control unit 14 is stored in the storage unit 13. This training data is information indicating the incoming direction, location, region, and the like of a wireless signal from an authorized device (authorized direction, location, region, and the like). This training data may include information indicating the incoming direction, location, region, and the like of a wireless signal from an unauthorized device (unauthorized direction, location, region).

The control unit 14 is implemented by a central processing unit (CPU), a network processor (NP), a field programmable gate array (FPGA), and the like and executes a process program stored in a memory. This control unit 14 has a function of common wireless LAN routers as well as a function of constructing the training data described above and a function of determining whether the access direction of a detection target device is an authorized access direction, based on the training data.

For example, as illustrated in FIG. 1, the control unit 14 includes a learning module 141, an identifying module 142, a determination module 143, and an alarm output module 144. These functional modules may be individually or partially implemented in different pieces of hardware. The control unit 14 may include other functional modules.

The learning module 141 learns training data indicating an incoming direction (access direction) of a wireless signal from an authorized device.

For example, the learning module 141 learns a permissible access direction and a non-permissible (suspicious) access direction using a machine learning method when the wireless LAN router 10 is installed. For example, the learning module 141 learns areas, such as a lobby and some meeting rooms, where access to the wireless LAN router 10 is not permitted even on the same floor in the office, and constructs training data indicating the areas described above.

There are two kinds of devices connecting to a network:
- stationary devices: mainly IoT devices, desktop computers, or servers; and
- mobile devices: laptop computers, smartphones, and the like.

The training data constructed by the learning module 141 covers the devices in the categories above.

For example, for a stationary device, the learning module 141 constructs training data of an access area map indicating the location and direction of a legitimate wireless signal coming from the stationary device (for example, on the real company premises or outside the premises (for example, in the case of a company that occupies only a part of a building, a card key reader or a camera outside a door of the building)).

For example, when the access direction of the stationary device is changed, the determination module 143 detects the change based on the training data as described above. Subsequently, for example, the determination module 143 issues an alarm to request a network security administrator to validate the change in access direction of the stationary device. When the network security administrator has validated the change in access direction of the stationary device, the learning module 141 learns a new access direction and location of the stationary device.

For example, for a mobile device, the learning module 141 learns a map of an area in which access to the network by the mobile device is authorized. The learning is performed, for example, as follows.

First of all, a person carrying a mobile device walks around the area. The learning module 141 thus can initialize the training data with a map of an area in which access to the network is authorized.

Subsequently, the wireless LAN router 10 makes preliminary settings such that all network access by the mobile device is checked and an alarm for access from an area except for the authorized area indicated by the training data is issued to a network administrator (for example, access detected from a parking lot is likely to have a higher risk than access detected from a meeting room on the company premises).

Subsequently, the training data is changed by a response from the network administrator or, for an area that does not require intervention by the network administrator, by the use of the machine learning method (for example, when the learning module 141 learns that a certain laptop is frequently used in some meeting rooms, the learning module 141 expands the network access map in the training data for the certain laptop).

The identifying module 142 identifies the ratio of power received by the antennas 11, for each device that the wireless LAN router 10 communicates with. Then, when the ratio of power received by the antennas 11 changes at some point of time in the future, the identifying module 142 can identify that the device has moved (or the environment architecture of the device has changed). Thus, for example, when the device is a device supposed to be at a stationary place, the identifying module 142 can identify that the location of the device has been changed (there is a possibility that a man-in-the middle attack has been made).

The determination module 143 determines whether a wireless signal from a target device is a wireless signal from an authorized direction, using the incoming direction of the wireless signal from the target device and the training data constructed by the learning module 141. For example, the determination module 143 determines whether a wireless signal from the device is a wireless signal from an authorized direction, using the incoming direction of the wireless signal from the device and the training data constructed by the learning module 141. The determination module 143 then outputs a result of determination.

For example, when the identifying module 142 identifies that the location of the stationary device has been changed, the determination module 143 identifies the incoming direction (access direction) of a wireless signal from the device, based on the direction of the directional antenna 11A and the ratio of power at the time of reception of the wireless signal from the device. The determination module 143 then determines whether the access direction of the device differs from the authorized direction indicated by the training data on the device. The determination module 143 also determines whether the access direction of a mobile device belongs to the authorized area indicated by the access area map of the training data on the device.

The alarm output module 144 outputs an alarm based on the result of determination by the determination module 143. For example, when the determination module 143 determines that the access direction of the device differs from the authorized direction indicated by the training data on the device, the alarm output module 144 outputs an alarm to this effect. For example, when the determination module 143 determines that the access direction of the device does not belong to the authorized area indicated by the access area map of the training data on the device, the alarm output module 144 outputs an alarm to this effect.

Exemplary Process Procedure

Referring now to FIG. 2, an exemplary process procedure of the wireless LAN router 10 will be described. For example, the learning module 141 of the wireless LAN router 10 constructs training data indicating a permissible access direction and a non-permissible access direction for each device by the machine learning (S1).

Subsequently, when the wireless LAN router 10 receives a wireless signal from a device with the directional antenna 11A, the determination module 143 identifies the access direction of the device (S2). The determination module 143 then determines whether the access direction of the device is an authorized access direction, based on the training data on the device constructed by the learning module 141 (S3).

Here, if the determination module 143 determines that the access direction of the device is not an authorized access direction (No at S4), the alarm output module 144 outputs an alarm (S5). For example, the alarm output module 144 outputs an alarm to the effect that the access direction of the device is not an authorized access direction. Subsequently, a network security administrator checks the location and direction of the device that has caused the alarm, and if no problem is found, the learning module 141 learns a new access direction and location of the device. In other words, the learning module 141 updates the training data on the device.

On the other hand, if the determination module 143 determines that the access direction of the device is an authorized access direction (Yes at S4), the process ends.

Such a wireless LAN router 10 can construct individual network access maps and keep learning for certain devices (for example, certain laptop computers, smartphones, and the like owned by certain persons). Accordingly, the granularity by which the wireless LAN router 10 identifies possibly malicious network access becomes significantly fine. Consequently, the number of erroneous detections to which network security administrators tend to devote much time can be reduced.

For both of stationary devices and mobile devices, the permissible locations and the non-permissible locations change with time. Here, updating the network access maps to keep up with these changes may be a huge burden to network administrators as they may forget to update. By comparison, like the wireless LAN router 10, using the machine learning method to update these network access maps over time has a significant advantage.

For example, when a new IoT device is installed, the wireless LAN router 10 not only simply connects to the IoT device but also registers the direction (access direction) of communication with the IoT device. There may be a plurality of wireless LAN routers 10 that communicate with the IoT device. For example, network security software can acquire information from a plurality of wireless LAN routers 10 and thereby construct a network access map of exact locations (in addition to the directions) of IoT devices.

In this way, for each network access event of a device, the wireless LAN router 10 identifies from where a request is sent and whether it is a normal access angle or a suspicious location in the environment. The wireless LAN router 10 can identify that the direction of a signal is wrong without processing communication per se and issue a direction alarm. This increases the accuracy of the wireless LAN router 10 to determine the authenticity of a device accessing a network and can further reduce the possibility that a man-in-the middle attack is accomplished (the effect of this technique also lies in that even when physical access is possible, wireless wiretapping from another location is difficult, because a hacker impersonating an IoT device has to make access from the exact physical location of the IoT device).

Furthermore, the wireless LAN router 10 also uses an unsupervised machine learning since it constructs a model (training data) of a permissible request direction and a suspicious request direction by learning the directions of access periodically made for all the devices connecting to a network, and eliminating mobile devices. Such a model can be constructed for a group of all devices connecting to a network or for each individual device.

Conventional solutions prevent data access threats using wireless LAN routers, such as direct access and man-in-the middle attacks in company computers or IoT networks, home networks, and dynamic environments.

In comparison, the wireless LAN router 10 in the present embodiment has a new advantage of constructing a physical map of each IoT device in a company, in addition to the advantage described above. The present embodiment provides a useful tool for maintenance of devices because the actual location of each IoT device can be always identified.

Unfortunately, none of the following related literatures (prevention of a man-in-the middle attack) disclose a learning model that prevents a man-in-the middle attack using a wireless LAN router having a directional antenna.

U.S. Pat. No. 10,104,098 teaches that electro-magnetic signatures serving as baselines are constructed for all the devices in an environment and variations thereof are analyzed. However, this is a very static approach and does not function, for example, in office environments or places where mobile devices are permitted. When a small change is permitted in an IoT environment, this approach fails to prevent a type of attack that attacks a communication path from one of the devices to a network router, such as a man-in-the middle attack.

United States Patent Application No. 20190207965 also teaches that a static baseline chart of directional device characteristics is constructed and continuously compared. This is a more comprehensive characteristics map and includes man-in-the middle attacks, however it does not function in a dynamic environment such as a company, unless a significant change from the baseline is permitted.

In contrast to the above, the wireless LAN router 10 functions even in an extremely dynamic environment while allowing to identify a suspicious network access event.

Computer Program

A computer program that describes a process performed by the wireless LAN router 10 according to the foregoing embodiment in a computer-executable language can be created. In one embodiment, the wireless LAN router 10 can be implemented by installing a detection program that executes the detection process described above as package software or online software in a desired computer. For example, an information processing device can be functioned as the wireless LAN router 10 by executing the detection program described above by the information processing device. As used herein the information processing device includes a desktop or notebook personal computer. Other examples of the information processing device include mobile communication terminals such as a smartphone, a mobile phone, and a personal handy phone system (PHS), and slate terminals such as a personal digital assistant (PDA). The functions of the wireless LAN router 10 may be implemented in a cloud server.

FIG. 3 is a diagram illustrating an exemplary computer that executes the detection program. A computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a read-only memory (ROM) 1011 and a RAM 1012. The ROM 1011 stores, for example, a boot program such as Basic Input Output System (BIOS). The hard disk drive interface 1030 is connected to a hard disk drive 1090. The disk drive interface 1040 is connected to a disk drive 1100. For example, a removal storage medium such as a magnetic disk and an optical disk is inserted into the disk drive 1100. For example, a mouse 1110 and a keyboard 1120 are connected to the serial port interface 1050. For example, a display 1130 is connected to the video adapter 1060.

The hard disk drive 1090 stores, for example, an OS 1091, an application program 1092, a program module 1093, and program data 1094. The information described in the foregoing embodiment is stored, for example, in the hard disk drive 1090 and/or the memory 1010.

The detection program is stored, for example, as the program module 1093 that describes a command to be executed by the computer 1000, in the hard disk drive 1090. Specifically, the program module 1093 that describes each process to be executed by the wireless LAN router 10 described in the foregoing embodiment is stored in the hard disk drive 1090.

Data used in information processing by the detection program is stored as program data 1094, for example, in the hard disk drive 1090. The CPU 1020 reads the program module 1093 and the program data 1094 stored in the hard disk drive 1090 into the RAM 1012 as necessary, and executes the procedures described above.

The program module 1093 and the program data 1094 for the detection program are not necessarily stored in the hard disk drive 1090 and may be stored in, for example, a removable storage medium and read into the CPU 1020 through the disk drive 1100 or the like. Alternatively, the program module 1093 and the program data 1094 for the detection program may be stored in another computer connected via a network such as a LAN and a wide area network (WAN) and read into the CPU 1020 through the network interface 1070.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless local area network router comprising: a directional antenna configured to transmit and receive wireless signals to and from a detection target device; and a processing circuit, wherein
   the processing circuit is configured to:
   train a machine learning model using training data, wherein the training data indicates an authorized incoming direction of a wireless signal from the authorized device to connect to a wireless local area network;
   determine, based on the trained machine learning model, whether a detected wireless signal of a detection target device is from an authorized direction, wherein an incoming direction of the detected wireless signal from the detection target device received by the directional antenna corresponds to the authorized incoming direction; and
   output a result of the determination.

2. The wireless local area network router according to claim 1, wherein the training data including an unauthorized incoming direction of an unauthorized wireless signal from an unauthorized device.

3. The wireless local area network router according to claim 1, wherein the authorized device includes a stationary device and a mobile device.

4. The wireless local area network router according to claim 1, wherein
   the authorized device is a stationary device.

5. The wireless local area network router according to claim 1, wherein
   the training data indicate the authorized device as the stationary device, and the training data describes the authorized incoming direction of the wireless signal from the stationary device.

6. The wireless local area network router according to claim 1, wherein
   the training data indicate the authorized device as a mobile device, and the authorized incoming direction includes a plurality of directions from which the authorized device connects to the wireless local area network.

7. The wireless local area network router according to claim 1, wherein
   the training data indicate the authorized device as a mobile device, and the authorized incoming direction includes a plurality of regions in which the authorized device connects to the wireless local area network.

8. A detection method performed by a wireless local area network router, the detection method comprising:
   training a machine learning model using training data, wherein the training data indicate, an authorized incoming direction of a wireless signal from the authorized device to connect to a wireless local area network;
   determining, based on the trained machine learning model, whether a detected wireless signal of a detection target device is from an authorized direction, wherein an incoming direction of the detected wireless signal from the detection target device received by a directional antenna of the wireless local area network router corresponds to the authorized incoming direction; and
   outputting a result of the determination.

9. A non-transitory recording medium storing a detection program for causing a computer to execute a process comprising:
   training a machine learning model using training data, wherein the training data indicate, an authorized incoming direction of a wireless signal from the authorized device to connect to a wireless local area network;
   determining, based on the trained machine learning model, whether a detected wireless signal of a detection target device is from an authorized direction, wherein an incoming direction of the detected wireless signal from the detection target device received by a directional antenna corresponds to the authorized incoming direction; and
   outputting a result of the determination.

* * * * *